United States Patent

[11] 3,586,878

[72] Inventor Kenneth Y. Maxham
Richardson, Tex.
[21] Appl. No. 807,758
[22] Filed Mar. 17, 1969
[45] Patented June 22, 1971
[73] Assignee Collins Radio Company
Dallas, Tex.

[54] SAMPLE, INTEGRATE AND HOLD CIRCUIT
12 Claims, 4 Drawing Figs.

[52] U.S. Cl. .......... 307/234, 328/151, 307/246
[51] Int. Cl. .......... H03k 17/60
[50] Field of Search .......... 328/151, 164; 307/246, 234

[56] References Cited

UNITED STATES PATENTS 2,697,782 12/1954 Lawson .......... 328/151
3,205,447 9/1965 Richards .......... 307/234
3,253,155 5/1966 Randall .......... 307/234
3,387,144 6/1968 Juliusburger .......... 307/234
3,375,501 3/1968 McCutcheon et al. .......... 328/151
3,505,609 4/1970 Varsos et al. .......... 328/151

*Primary Examiner*—Donald D. Forrer
*Assistant Examiner*—Harold A. Dixon
*Attorneys*—Warren H. Kintzinger and Robert J. Crawford

ABSTRACT: A signal sample, integrate, and hold circuit with data signal samples AND enabled to generally insure that when a signal is coexistent with the enable signal only a portion of the data bit truly predictably present in certain data bit cycle periods is passed to an integrating circuit with charging of a capacitor thereby to and through a triggering circuit threshold voltage actuating level. The triggering circuit in turn along with a clock signal actuates a flip-flop circuit providing data output one period delayed from data timing system referenced.

Figure 1:
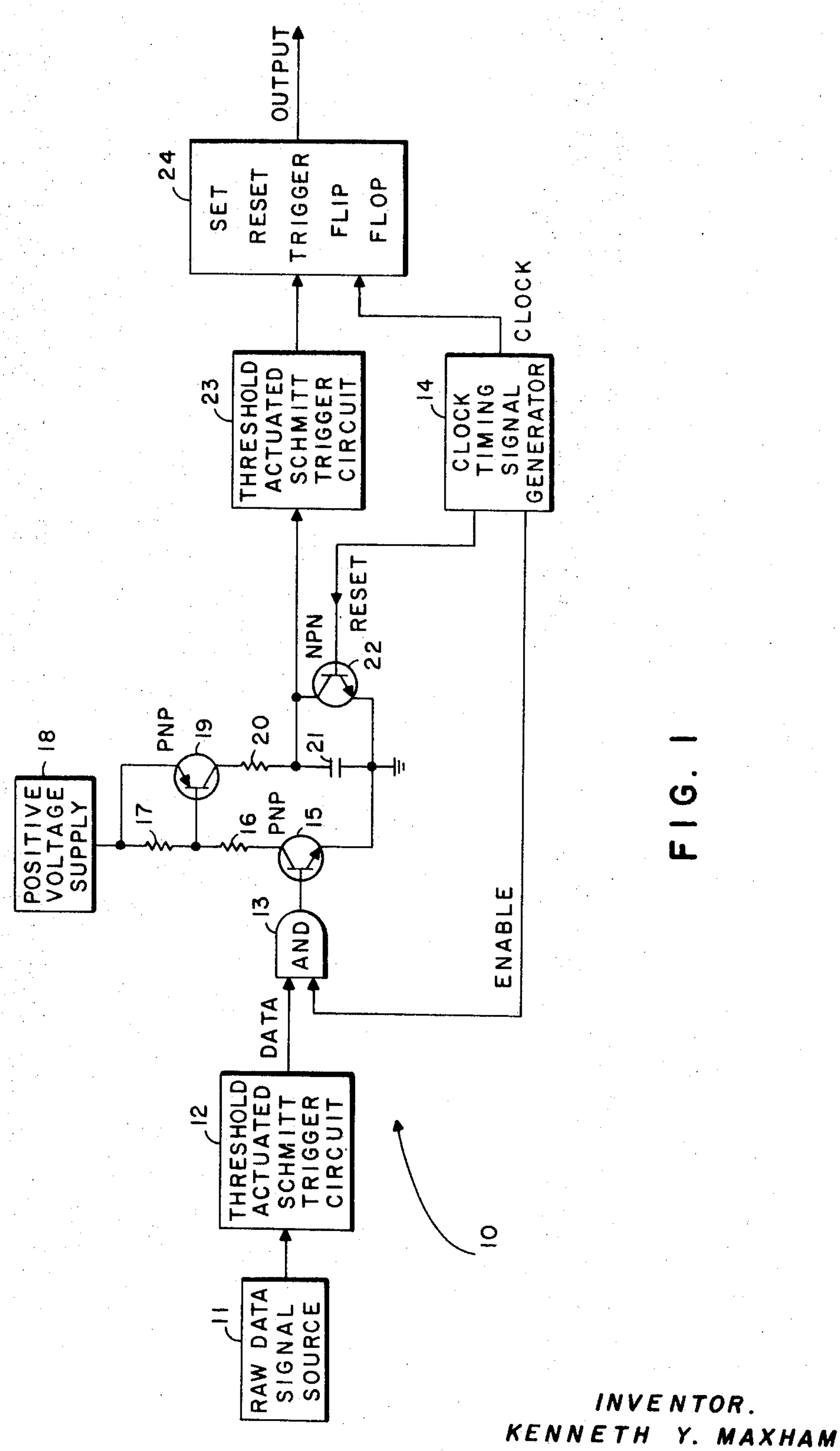

INVENTOR.
KENNETH Y. MAXHAM

BY Warren H. Kintzinger
ATTORNEY

INVENTOR.
KENNETH Y. MAXHAM
BY Warren H. [signature]
ATTORNEY

INVENTOR.
KENNETH Y. MAXHAM
BY Warren H. Kintzinger
ATTORNEY

SAMPLE, INTEGRATE AND HOLD CIRCUIT

This invention relates in general to the transmission and detection of digital data, and in particular, to a sample, integrate, and hold circuit that provides for integration through a period of only the part of a signal known to be, generally, correct at substantially all times.

While signal threshold and integrator circuits have been and are being used in the detection of transmitted digital data, there have been problems of signal transmission and recovery, particularly in noisy environments. With entire digital data signals being detected and integrated, there is more data error in the detected signal due to incoming signal fluctuations such as delay or advance of the signal or as a result of periodic noise.

It is, therefore, a principal object of this invention to provide a sample, integrate, and hold circuit for improved, more reliable detection of transmitted digital data.

Another object with such a sample, integrate, and hold circuit is to minimize detected digital data signal transmission deterioration from signal delay or advance fluctuations and from periodic noise.

Features of this invention useful in accomplishing the above objects include, in a sample, integrate, and hold circuit, integration of only a part of the digital data signal transmission detected generally known to be correct by "AND" functioning the data with an enable clock circuit generated signal before the signal integrating function and provision of a digital data signal hold.

Specific embodiments representing what are presently regarded as the best modes of carrying out the invention are illustrated in the accompanying drawings.

Figure 2:
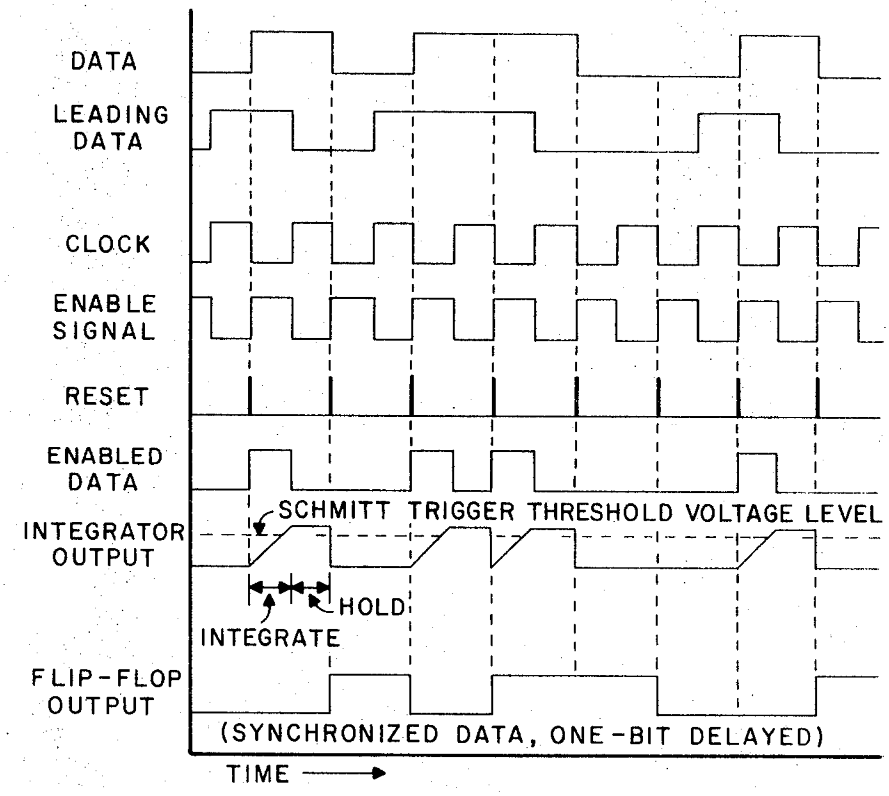
Figure 4:
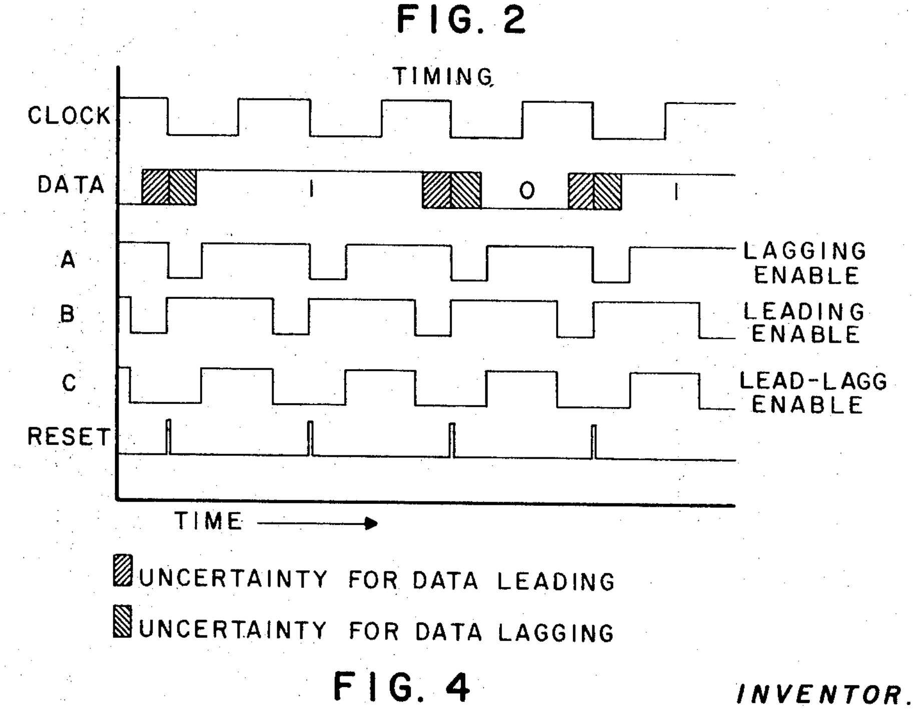
Figure 3:
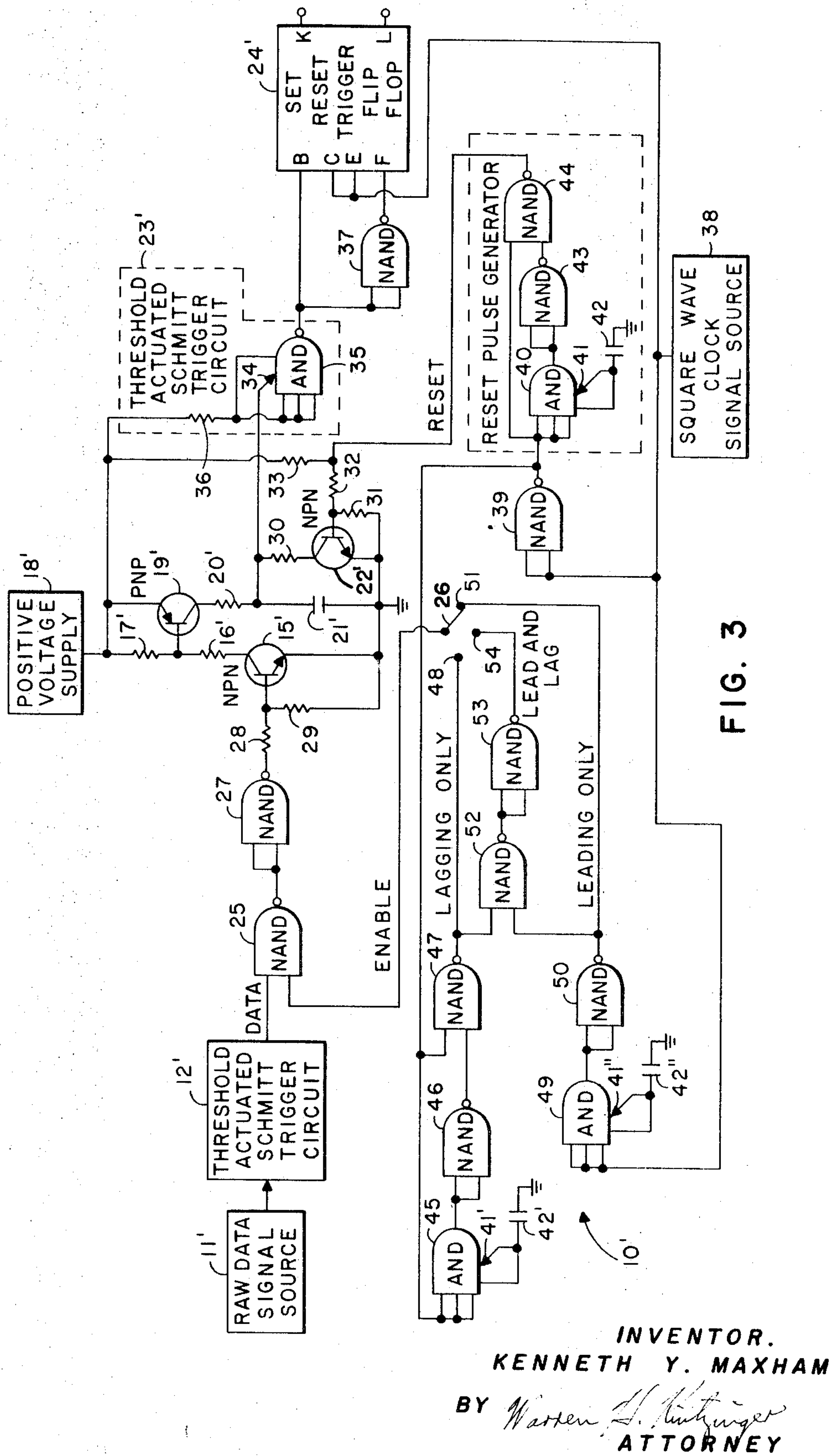

In the drawings:

FIG. 1 represents a schematic and block diagram of a sample, integrate, and hold circuit, particularly for incoming data leading the timing in the detector by as much as approximately one-half of a bit;

FIG. 2, data leading, data, clock, and various other signal waveforms developed in the circuit and a flip-flop output signal from the sample, integrate, and hold circuit of FIG. 1;

FIG. 3, a more involved schematic and block diagram for a sample, integrate, and hold circuit selectively switchable between lag only, lead only, and lead and lag modes of operation; and, FIG. 4, signal waveforms for the sample, integrate, and hold circuit of FIG. 3.

Referring to the drawings:

The sample, integrate, and hold circuit 10 of FIG. 1 is shown to include a raw data signal source 11 supplying a signal to a threshold actuated Schmitt trigger circuit 12 for developing a data input to AND gate 13. The AND gate 13 which also receives an enable input from clock timing signal generator 14 has its output connected as the control signal electrode input to the base of NPN transistor 15. The emitter of NPN transistor 15 is connected to ground while the collector output thereof is connected serially through resistors 16 and 17 to positive voltage supply 18. The common junction of resistors 16 and 17 is connected as the controlling electrode signal input connection to the base of PNP transistor 19 having an emitter connection to the positive voltage supply 18 and a collector signal output connection to and through resistor 20 to the junction of capacitor 21 and the collector of NPN transistor 22, and, as an input, to threshold actuated Schmitt trigger circuit 23. The other side of capacitor 21 and the emitter of NPN transistor 22 are connected to ground. The controlling base electrode of NPN transistor 22 is connected for receiving a reset input from clock timing generator 14. The output of threshold actuated Schmitt trigger circuit 23 and a connection from clock timing signal generator 14 are connected as the operating inputs for set-reset trigger operation of flip-flop circuit 24 in developing the desired output therefrom and from the sample, integrate, and hold circuit 10.

Referring also the waveforms of FIG. 2 to get a better understanding of operational functioning of the circuit, the incoming signal data is of the nonreturn to zero digital-type data. With variations in the length and type of connecting cables employed and other system variations, as related to the data waveform, the data supplied from raw data signal source 11, and processed through the threshold actuated Schmitt trigger circuit 12 to a square wave waveform, may be leading the timing in the detector circuit by as much as one-half a bit as indicated by the leading data waveform. The clock timing and signal generator supplies a clock waveform as shown and an enable waveform that is applied as an input to AND gate 13 along with the leading data signal from the Schmitt trigger circuit 12. The clock timing signal generator 14 also supplies a reset pulse of short duration repetitively in equal timing, consistent with the clock waveform length and in synchronous with the initiation of the enable signal, applied as an activating input to the reset terminal of the integrating circuit which is the controlling base electrode of NPN transistor 22. The portion of the leading data signal equal in time to the enable signal waveform, as passed by AND gate 13 to enhance the detection of out-of-phase digital signals, is applied as a controlling signal input to the base of NPN transistor 15 through the time period length of the activating voltage portion of this waveform for maintaining the NPN transistor 15 in the conduction state. This biases PNP transistor 19 to conduction for substantially the same period of time in each operational cycle to thereby establish a charging path as an integration circuit to develop a charge on capacitor 21 that is held after cutoff of NPN transistor 15 and PNP transistor 19 through the remainder of each period until the next reset pulse is applied to the base of NPN transistor 22. When transistor 22 is biased to conduction by each reset pulse, a discharge path for capacitor 21 is established for each bit period. The integrator circuit output, as shown by the integrator output waveform, is applied as an input to threshold actuated Schmitt trigger circuit 23 for obtaining a threshold voltage level trigger output from the Schmitt trigger circuit 23. This output is applied as an input to the set-reset trigger flip-flop circuit 24 to result through delay actuation cycling therethrough, as controlled by the clock signal input to the circuit 24, the development of a one-bit delayed output duplication of the data signal that is also one and one-half bits delayed from the leading data signal waveform shown in FIG. 2 as the output with the sample, integrate, and hold circuit of FIG. 1.

Referring now to the sample, integrate, and hold circuit 10' of FIG. 3, a raw data signal source 11' which may be supplying a leading or lagging data signal or a signal which fluctuates between the two extremes of lead and lag as an input to the threshold actuated Schmitt trigger circuit 12'. The data output of the Schmitt trigger circuit 12' is applied as an input to NAND gate 25 which also receives an enable input from switch 26. The output of NAND gate 25 is applied as both of the inputs to NAND gate 27, the output of which is applied through resistor 28 to the base of NPN transistor 15' and with the junction of resistor 28 and the base of NPN transistor 15' being connected through resistor 29 to ground. Please note, with the NPN transistor 22' associated with this integrator circuit, that a resistor 30 is included in the connection between the collector thereof and the junction of resistor 20' and capacitor 21' and the lead output connection to the threshold actuated Schmitt trigger circuit 23'. With the NPN transistor 22' a resistor 31 is also connected between the transistor base and ground, a resistor 32 is included in the reset pulse signal path to the junction of the base of the transistor 22' and resistor 31. The reset signal line, in addition to being connected through resistor 32 to the base of NPN transistor 22', is connected through resistor 33 to the positive voltage supply 18'. The output of the integrating circuit is applied to a trigger input 34 to a multiple input AND gate 35 of the threshold actuated Schmitt trigger circuit 23' that has four voltage connections thereto in common through resistor 36 from positive voltage supply 18'. The output of the Schmitt trigger circuit 23 is applied directly to the B terminal of set-reset trigger flip-flop 24' and also in common to the two inputs of NAND gate 37, the output of which is applied as an input to the F terminal of the set-reset trigger flip-flop 24', from which K and L output connections may be connected for utilization as desired. The square wave clock signal source 38 is connected in common to both the C and E inputs of the set-reset trigger flip-flop 24'. The output of the square wave clock signal source 38 is also connected as an input to the two input terminals of NAND gate 39, the output of which is connected as three inputs to AND gate 40.

Please note that the AND gate 40 is a three input AND gate quite similar to the AND gate 35 with, however, actuation to development of an output therefrom being controlled by a voltage threshold level input through a signal input electrode 41 thereto with the threshold voltage level attained through time delay charging of the capacitor 42 from initiation of and subsequent to an input signal being applied to the three input connections in common from the NAND gate 39. This is with the predetermined time delay determined by the charging rate of the capacitor 42 relative to the voltage supply of the AND gate 40. The output of AND gate 40 is connected to the two inputs of NAND gate 43, the output of which is connected along with a direct connection of the output of NAND gate 39, as the two inputs to NAND gate 44 to develop a desired reset pulse waveform such as shown in FIG. 4 for application as the reset input through resistor 32 to the base of NPN transistor 22'.

It is of interest to note that the operational functioning of the integrating circuit portion of the sample, integrate, and hold circuit 10' is much the same as with the corresponding circuit section of the embodiment of FIG. 1. Additional components in the embodiment of FIG. 3, the signal path resistor 28 and the bias resistor 29 from the base of transistor 15' to ground, resistor 30 in the collector circuit of NPN transistor 22' to protect the transistor from burn out with each reset discharge of capacitor 21' and resistors 31, 32 and 33 are provided for more closely controlled voltage biasing and protection of the respective circuit components. This is with, in both embodiments, the integrator circuit output Schmitt trigger threshold actuating voltage level being sufficiently high that under most any generally encountered condition of noise, the noise voltage passed to and through AND gate 13, as may occur during the enable period, just would not be such as to result in the capacitor 21 or 21', as the case may be, charge integrating to such a voltage level as to pass through the threshold activating voltage level for the threshold actuated Schmitt trigger circuit 23 or 23', respectively.

The output of NAND gate 39 is also connected to three input AND gate 45, functionally substantially the same as AND gate 40, with a voltage threshold activating electrode 41' for activating the AND gate to produce an output at a predetermined time delayed interval after application of an input signal voltage pulse through the three common inputs from the output of NAND gate 39 with the time delay determined by the charging rate of capacitor 42', the other end of which is connected to ground. The output of AND gate 45 is applied as an input to two common connected inputs of NAND gate 46, the output of which is applied as one of the inputs along with the connection from the output of NAND gate 39 as the other input to NAND gate 47 for developing an enable for a lagging only signal. This enable signal is fed to switch terminal 48 that may be selectively connected to the switch contact arm 26 for lagging only enable functioning of the sample, integrate, and hold circuit 10'. The output of square wave clock signal source 38 is also applied in common to three inputs of three input AND gate 49 that develops actuation to output signaling therefrom with a predetermined time delay factor much the same as with the AND gate 40 and AND gate 45, with the control electrode 41'' and the charging capacitor 42'', for developing a delayed signal output applied to the two inputs to NAND gate 50. This results in a leading only enable signal being fed to switch contact 51 that may be selectively connected to the switch arm 26. Both the lagging enable signal from NAND gate 47 and the leading enable signal from NAND gate 50 are applied as two inputs to NAND gate 52, with the signal output thereof being applied as two inputs to NAND gate 53 for developing a lead-and-lag enable signal output from NAND gate 53. This enable signal is applied to switch terminal 54 that may be selectively switch connected through switch arm 26 as the enable signal for the sample, integrate, and hold circuit 10'.

The signal waveform showing of FIG. 4 while not showing the equivalent of all of the waveforms of FIG. 2, with respect to the embodiment of FIG. 1, does show the variations of interest with respect to the embodiment of FIG. 3. The square wave clock signal is shown again and the data waveform shown is with different variations thereof, as related to uncertainty with respect to data leading and uncertainty with respect to data lagging for respective operationally encountered signal variations as may be encountered with switching of system circuits as related to definite data time standards and signal sequencing and synchronous relating. In any event, waveform A represents a lagging enable signal that is developed when switch arm 26 is switched to terminal 48 for the data signal lagging only mode of operation and insuring that the sample period of enable is ANDed generally only during that portion of time with true data signal content present for processing through the integrator circuit much the same as with the embodiment of FIG. 1. The waveform B represents a leading enable waveform that does the same for operation with the switch arm 26 switched into engagement with contact 51 for the data signal leading only mode of operation. Further, where the signal varies between the two extremes through uncertainty for data leading and uncertainty for data lagging as indicated by the respective data waveform cross-hatched sections, the waveform C represents a lead-lag enable signal that insures only true signal content being passed to the integrating circuit in much the same fashion as with operation hereinbefore described with the embodiment of FIG. 1. The reset waveform represents a reset signal pulse train with each reset pulse as applied through resistor 32 to the base of NPN transistor 22', substantially clearing capacitor 21' of any charge buildup that has been imparted thereto with each bit period cycle of operation.

Components and values used in a sample, integrate, and hold circuit in general accord with the embodiment of FIG. 3 include the following:

| | |
|---|---|
| NPN transistors 15' and 22' | 2N2222 |
| Resistors 16', 28 and 31 — K ohms | 4.7 |
| Resistor 17' — do | 2.2 |
| Positive voltage supply 18' — volts | +5 |
| PNP transistor 19' | 2N2907 |
| Resistor 20' — K ohms | 3.3 |
| Capacitor 21' — μf | 0.039 |
| Flip-flop 24' | SF31 |
| NAND gates 25, 27, 37, 39, 43 44, 46, 47, 50, 52, and 53 | SG141 |
| Resistor 29 — K ohms | 6.8 |
| Resistor 30 — ohms | 10 |
| Resistors 32 and 33 — K ohms | 1 |
| Three input AND gates 35, 40, 45 and 49 | ½ SG81 |
| Clock signal source 38 — Hz | [1] 4,800 |
| Capacitor 42 — pf | 1,000 |
| Capacitors 42' and 42'' — μf | 0.033 |

[1] Square wave.

Whereas this invention is here illustrated and described with respect to two specific embodiments thereof, it should be realized that various changes may be made without departing from the essential contributions to the art made by the teachings hereof.

I claim:

1. In a data signal sample, integrate, and hold circuit for enhancing the detection of out-of-phase digital data: digital data signal input circuit means; clock timing signal generating means having a clock signal output, an enable signal output, and a reset signal output all in data bit frequency sequenced and synchronized relation; an AND gate circuit having input connections from said input circuit means and the enable signal output; signal integrating circuit means with energy accumulating capacitive means, with a charge through a signal level capability, connected to receive an input from the output of said AND gate circuit; a threshold activated change of state circuit connected to the output of said signal integrating circuit means for developing a detected signal resulting output at output means of said change of state circuit; reset circuit means connected across said energy accumulating capacitive means and connected to receive said reset signal output for repeated discharging of said energy accumulating capacitive means for each data bit operational cycle; and with the clock signal output of said clock timing signal generating means connected as an additional input to said threshold activated change of state circuit.

2. The data signal sample, integrate, and hold circuit of claim 1 wherein, said signal integrating circuit means includes a transistor circuit connected between a DC voltage supply and a voltage potential reference source with activation to completing a charging circuit path for said energy accumulating capacitive means upon receiving an activating input from said AND gate circuit; and said reset circuit means connected across said energy accumulating capacitive means includes a transistor with the emitter and collector electrodes in the reset discharge circuit path for said capacitive means, and the transistor base connected for receiving the reset signal output of said clock timing signal generating means.

3. The data signal sample, integrate, and hold circuit of claim 2 wherein, said clock timing signal generating means includes enable pulse delayed signal circuit means for leading only signals.

4. The data signal sample, integrate, and hold circuit of claim 2 wherein, said clock timing signal generating means includes enable pulse delayed signal circuit means for lagging only signals.

5. The data signal sample, integrate, and hold circuit of claim 2 wherein, said clock timing signal generating means includes two enable pulse delayed signal subcircuits, the first a leading only data signal enable circuit, and the second a lagging only data signal enable circuit; and switch means for switching between leading only and lagging only signal modes of operation.

6. The data signal sample, integrate, and hold circuit of claim 5 wherein, both the leading only and lagging only data signal enable subcircuits are connected to a lead-and-lag enable signal developing subcircuit; and with said switch means also selectively switchable to the lead-and-lag enable signal developing subcircuit.

7. The data signal sample, integrate, and hold circuit of claim 2 wherein, a threshold signal actuated first trigger circuit is included in the signal path of said digital data signal input circuit means.

8. The data signal sample integrate, and hold circuit of claim 7 wherein, a threshold signal actuated second trigger circuit is included in the circuit signal path to said threshold activated change of state circuit.

9. The data signal sample, integrate, and hold circuit of claim 8 wherein, said threshold activated change of state circuit is a set-reset trigger flip-flop circuit.

10. The data signal sample, integrate, and hold circuit of claim 2 wherein, said transistor circuit includes a transistor with the emitter and collector electrodes in the DC voltage supply to voltage potential reference charging path for said capacitive means, and the transistor base is connected for transistor saturation with signal output from said AND gate circuit.

11. The data signal sample, integrate, and hold circuit of claim 10 wherein, an additional transistor is provided with a base connection to the output of said AND gate circuit, an emitter connection to said voltage potential reference source, and a collector circuit connection through resistive means to said DC voltage supply and also to the base of the transistor in the charging path for said capacitive means.

12. The data signal sample, integrate, and hold circuit of claim 4 wherein, said DC voltage supply is a positive voltage supply; said voltage potential reference source is ground; said transistor in the charging path for said capacitive means is a PNP transistor with the emitter connected to the positive voltage supply; and the two other transistors are NPN transistors with emitters connected to ground.